United States Patent Office 2,840,125
Patented June 24, 1958

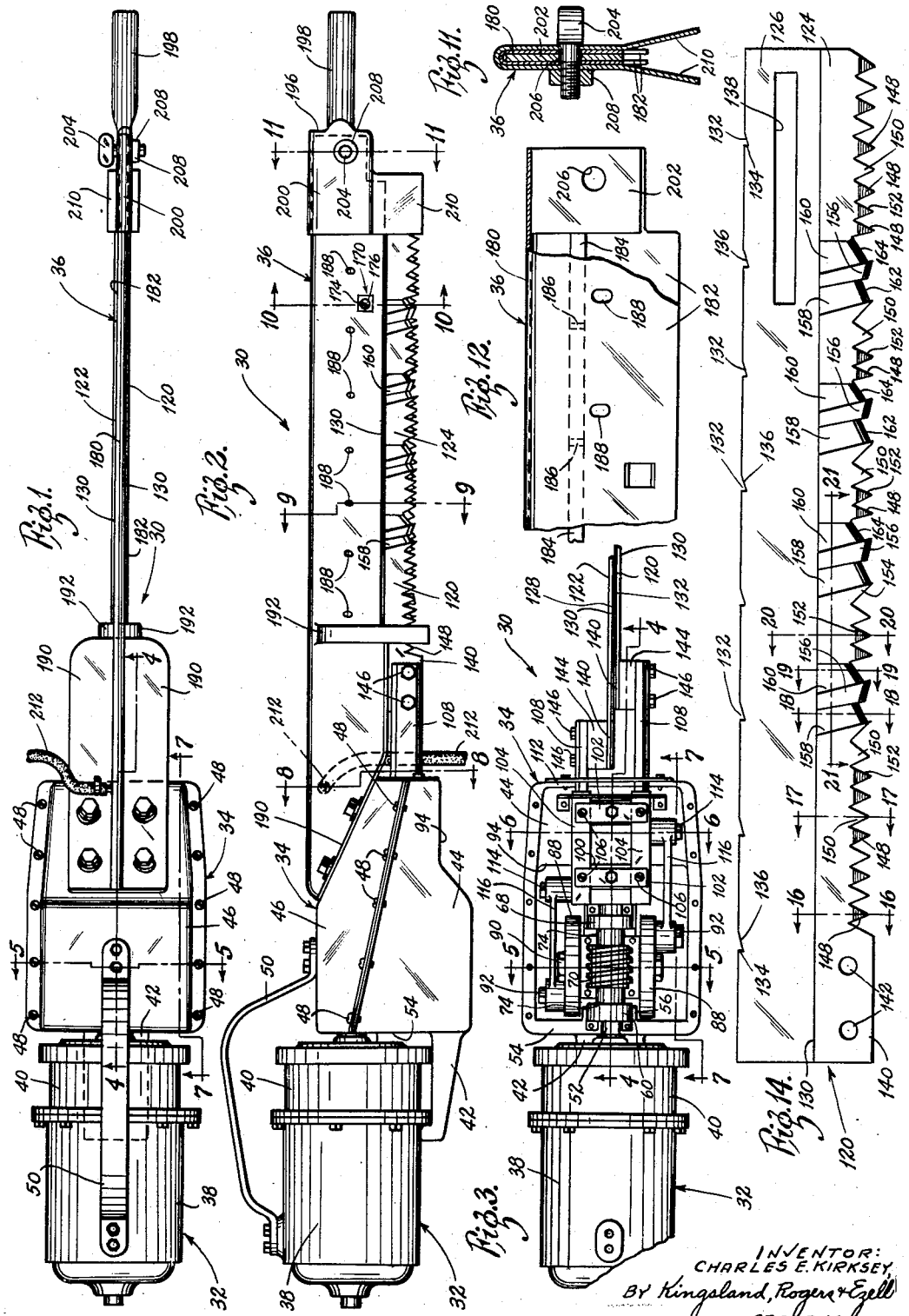

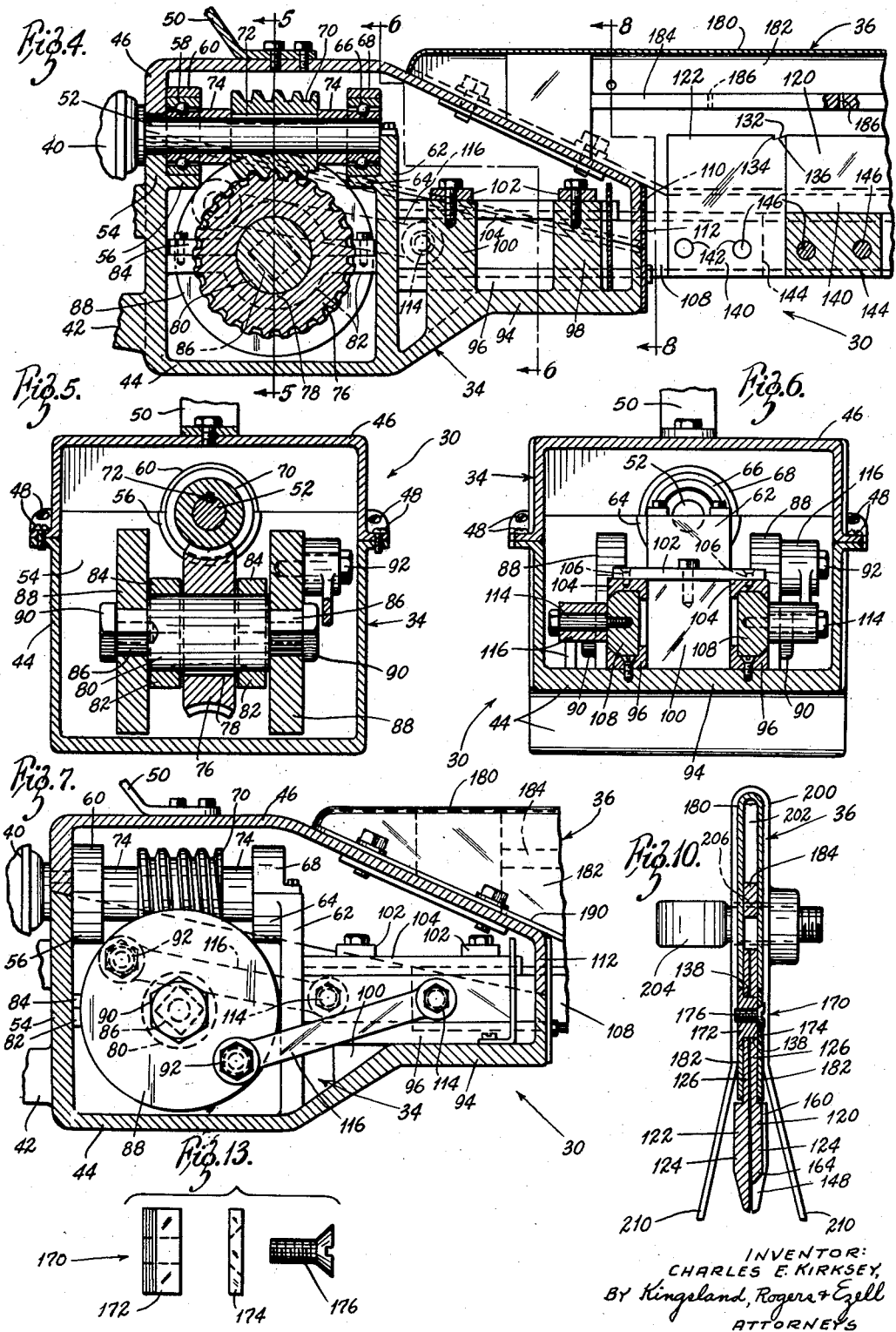

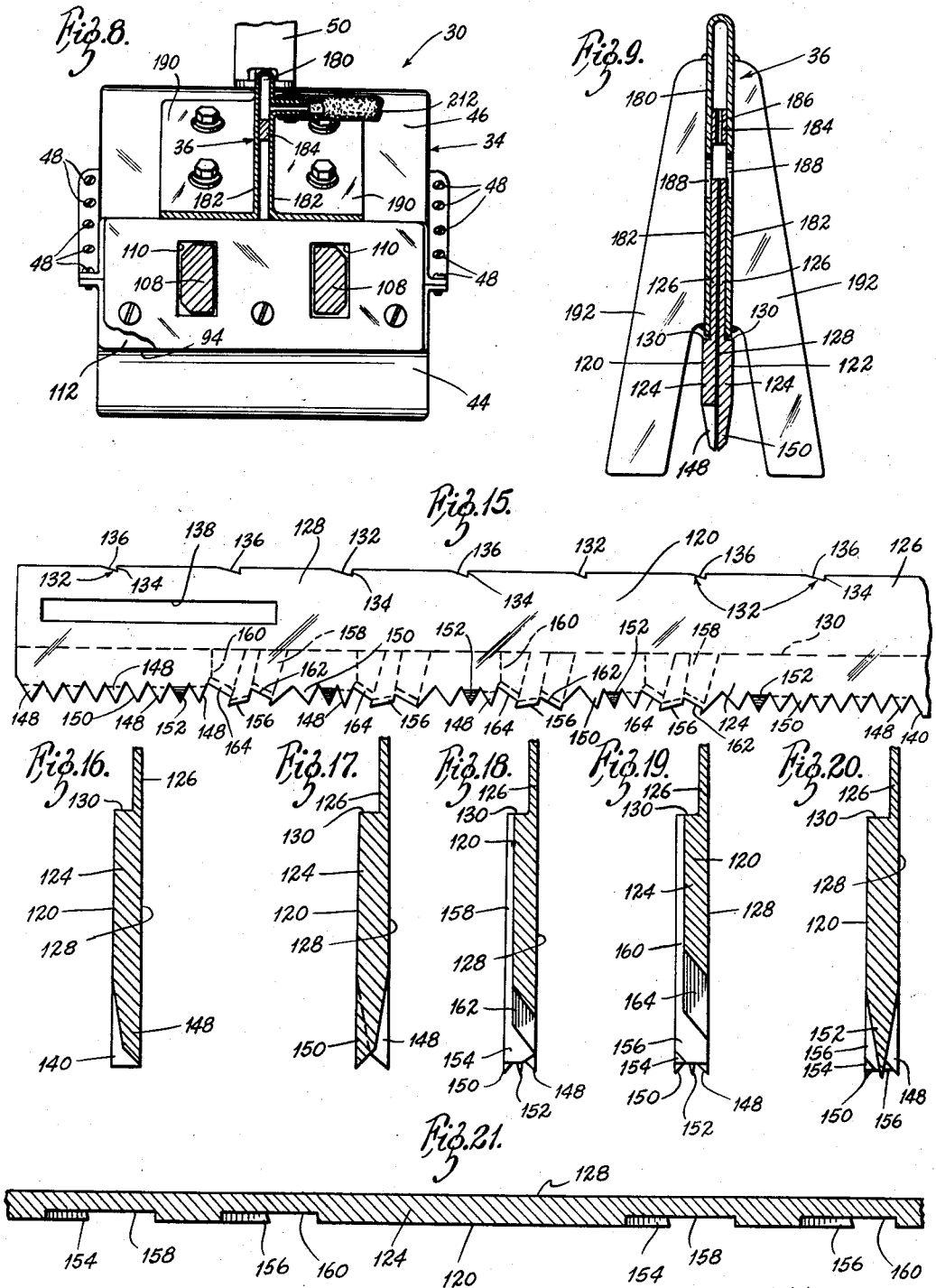

2,840,125

PORTABLE POWER SAW HAVING OPPOSITELY RECIPROCATING BLADES

Charles E. Kirksey, Paducah, Ky., assignor of one-tenth to Waller, Threlkeld and Whitlow, Paducah, Ky., a partnership, and one-tenth to John E. Kirksey, Paducah, Ky.

Application May 10, 1955, Serial No. 507,323

6 Claims. (Cl. 143—68)

The present invention relates generally to cutting devices, and more particularly to a novel portable power saw having an elongated blade assembly adapted to cut through a tree, log, timber, board, or the like, without the necessity of discharging accumulated sawdust from the kerf.

Briefly, the present invention contemplates a power driven blade assembly comprising twin oppositely reciprocable blades retained in contiguous relation by an elongated blade case which embraces the upper or back portions of the blades. The blades themselves are formed with a novel arrangement of cutting teeth and dust drags spaced so as to provide channels for passage of sawdust generally vertically past the blade assembly.

It is an object of the present invention to provide a novel power saw having an elongated blade assembly adapted to cut through trees, logs, timbers, boards, and the like, leaving comparatively smooth cut surfaces on each side of the kerf.

It is another object of the invention to provide a novel power saw having an elongated blade assembly which includes twin oppositely reciprocating blades which eliminate any tendency of the saw to move longitudinally as a result of its own operation.

It is another object of the invention to provide a novel power saw having an elongated blade assembly which includes a blade tooth arrangement permitting passage of sawdust past the blade assembly.

It is another object of the invention to provide a novel cutting assembly which includes movable toothed elements surmounted by a stationary sheath member which eliminates the likelihood of injury from inadvertent contact with the upper portion of the blade assembly.

The foregoing, along with additional objects and advantages, will be apparent from the following description taken in conjunction with the accompanying drawings, in which:

Figure 1 is a top plan view of a portable power saw conforming to the present invention;

Figure 2 is a side elevation thereof;

Figure 3 is a fragmentary view generally similar to Figure 1, but with certain cover portions removed so as to disclose operative elements of a drive mechanism;

Figure 4 is an enlarged fragmentary vertical section taken generally along the lines 4—4 of Figures 1 and 3;

Figure 5 is an enlarged vertical section taken generally along the lines 5—5 of Figures 1, 3 and 4;

Figure 6 is an enlarged vertical section taken generally along the lines 6—6 of Figures 3 and 4;

Figure 7 is an enlarged fragmentary vertical section taken generally along the lines 7—7 of Figures 1 and 3;

Figure 8 is an enlarged vertical section taken generally along the lines 8—8 of Figures 2 and 4;

Figures 9, 10 (Sheet 2) and 11 (Sheet 1) are enlarged vertical sections taken, respectively, along the lines 9—9, 10—10, and 11—11 of Figure 2;

Figure 12 is a fragmentary side elevation showing the free end of a blade case, a portion of the same being broken away to reveal the interior structure;

Figure 13 (Sheet 2) is an exploded view of a retaining assembly;

Figure 14 (Sheet 1) is a side elevation of a cutting blade, showing the logside of the same;

Figure 15 (Sheet 3) is a side elevation of a cutting blade, showing the side opposite that shown in Figure 14;

Figures 16, 17, 18, 19 and 20 are enlarged fragmentary vertical sections taken, respectively, along the lines 16—16, 17—17, 18—18, 19—19 and 20—20 of Figure 14; and Figure 21 is an enlarged fragmentary horizontal section taken generally along the line 21—21 of Figure 14.

Referring to the drawings in greater detail through the use of reference characters, the numeral 30 designates generally a portable power saw constructed in accordance with the teachings of the present invention. Broadly, the saw 30 comprises a prime mover 32, a drive mechanism 34, and a blade assembly 36 disposed in consecutive alignment as clearly illustrated in Figures 1 and 2.

The prime mover 32 may comprise any device, such as a gasoline or an electric motor of suitable size and appropriate power for actuating the drive mechanism 34 and the blade assembly 36 in the manner to be described. The illustrated prime mover 32 includes an electric motor 38 having a conventional clutch assembly 40 for selectively establishing a power connection to the drive mechanism 34, as is well understood.

The unitary motor 38 and clutch assembly 40 are supported primarily upon a bracket 42 extending rearwardly from a lower housing 44 within which the drive mechanism 34 is mounted. An upper housing or cover 46, secured to the lower housing 44 by means of screws 48 completes the enclosure of the mechanism 34 and also provides an attachment for the forward end of a handle bracket 50 the rear end of which is secured to the housing of the motor 38. This arrangement not only provides connecting support between the housing of the mechanism 34 and the prime mover 32, but also serves as a handle at one end of the portable saw 30.

The power connection between the prime mover assembly 32 and the drive mechanism 34 comprises a shaft extension 52 keyed to the driven element of the clutch assembly 40 and extending forwardly into the housing 44, 46 where it serves as an input shaft for the mechanism 34. It is, of course, understood that the present invention does not require a clutch between the prime mover and the drive assembly and that, as a matter of fact, it is preferred that small size electrically operated saws constructed in accordance with the invention have the motor connecetd directly to the drive mechanism.

The lower housing of the drive mechanism 34 may be of cast or fabricated construction and may take any convenient form appropriate to the housing and the support of the operative elements mounted therein. The illustrated housing 44, as best illustrated in Figures 4 through 7, is shaped for convenient accommodation of the particular power transmitting elements employed in the present embodiment of the invention. Thus, a rear wall 54 is provided with a cradle 56 for supporting a frictionless bearing 58 retained by a bearing cap 60. Spaced forwardly of the wall 54, a column 62 provided with a cradle 64 supports a frictionless bearing 66 retained by a bearing cap 68. As is clear from Figure 4, the aforementioned shaft 52 is rotatably supported in the bearings 58 and 66.

A worm 70 is mounted on the shaft 52 midway between the bearings 58 and 66 and is keyed to the shaft by a key 72. Spacing collars 74 retain the worm 70 in its centered position. A worm gear 76 is disposed in meshing engagement with the worm 70 and is keyed by means of a key 78 to a shaft 80 rotatably supported in twin bearing cradles 82 extending longitudinally between the rear wall 54 and the column 62. Bearing caps 84 cooperate with the cradles 82 in retaining the shaft 80. Each end of the shaft 80 terminates in a reduced portion 86 which is square in cross section and which mounts a crank disc 88 secured by a cap screw 90 threadedly engaging the shaft 80. Each of the crank discs 88 has a crank pin 92 secured eccentrically thereon so as to project outwardly from the outer face thereof, and these pins 92 are preferably disposed 180° apart relative to the shaft 80.

The forward part of the lower housing 44 is provided with a raised floor portion 94 to which a pair of parallel rail elements 96 are secured as best illustrated in Figures 6 and 7. A forward pillar 98 and rear pillar 100 (Fig. 4), both integral with the housing 44, extend upwardly between the parallel rails 96 and support hanger bars 102 which extend laterally of the housing 44 so as, in turn, to support parallel rails 104 secured to the hangers 102 by screws 106.

The lower rails 96 and the upper rails 104 are preferably formed to the cross section clearly illustrated in Figure 6 so as to cooperate in pairs for slidable retention of elongated crosshead members 108 which project in parallel spaced relation forwardly through individual openings 110 provided in a forward plate-covered wall 112 of the lower housing 44. This projecting relation is clearly illustrated in Figures 4 and 8.

Each of the crosshead members 108 has a pivot pin 114 secured therein adjacent its rearwardly disposed end, and each of the pivot pins 114 mounts the forward end of a connecting rod 116. The rear ends of the connecting rods 116 pivotally engage a respective crank pin 92 secured to the crank disc 88 as aforementioned. Clearly, this arrangement of the driving mechanism 34 is such as to provide, first, a speed reduction through the worm 70 and worm gear 76 and, second, a conversion from the rotary motion of the worm gear 76 to oppositely reciprocating motion of the twin crosshead members 108.

Directing attention now to the blade assembly 36, a right hand cutting blade 120 and a left hand cutting blade 122 are disposed in side-by-side relation as best illustrated in Figure 3. Opposite sides of the cutting blade 120 are shown in Figures 14 and 15, respectively, and it will be understood that the blade 122 is identical with the blade 120 except for being of opposite hand.

Typical cross sections through the cutting blade 120 are illustrated in Figures 16 through 20, from which it will be observed that the vertical extent of the blade 120 includes a lower toothed portion 124 which is relatively thick and an upper back portion 126 which is relatively thin. These portions 124 and 126 present a coextensive inside face 128 for sliding engagement with a similar face on the cutting blade 122. This arrangement, of course, provides an offset shoulder 130 adjacent the junction of the portions 124 and 126. It will also be noted that the blade 120 is tapered from an overall minimum thickness at the top to an overall maximum thickness at the bottom. As shown in Figures 14 and 15, the top edge of the back portion 126 has spaced notches 132 formed therein, and these notches preferably take the illustrated form wherein each has a rear vertical face 134 and an inclined forward face 136. An elongated slot 138 is provided in the forward end of the back portion 126 as clearly illustrated in these figures.

The lower or toothed portions of the blades 120 and 122 each include an untoothed connecting portion 140 at the rear end, this portion 140 being provided with threaded holes 142 by means of which the blades 120 and 122 are secured to respective crosshead members 108 as illustrated in Figure 3. Spacing blocks 144 are interposed between the cutting blades and their respective crosshead members 108, and screws 146 extend through the individual members 108 and blocks 144 to engage respective blades 120 and 122.

The portion of the blades 120 and 122 forwardly of the connecting portions 140 is provided with teeth arranged as generally indicated in Figures 14 and 15. These figures, along with the cross sections of Figures 16 through 20, show that there are five different types of teeth incorporated in the blade 120. These five types of teeth may be further subdivided by function into three types of cutting teeth and two types of drag teeth. All of the cutting teeth was a generally similar triangular contour as viewed from the side (Figures 14 and 15), and each is adapted to cut the wood from the different portion of the kerf. Thus, the numeral 148 designates an inside cutter, the numeral 150 designates a logside cutter, and the numeral 152 designates a grooving cutter.

Figure 16 shows the inside cutter 148 to be formed by tapering its outside, or logside face inwardly from the root or upper end of the tooth down to a point slightly above the lower cutting end then sharply increasing the taper down to the point of the tooth. The inside face of the tooth 148 is coincident with the inside face 128 of the lower portion 124. Figure 17 shows the logside cutter 150 to be formed to a similar, but reversed shape as compared to the tooth 148. The grooving cutter 152 is illustrated in Figure 20 to have both its side faces tapered uniformly down to the cutting point.

The two types of drag teeth incorporated in the blade 120 include a logside drag 154 and an inside drag 156. It will be observed from Figures 14 and 15 that while the logside drag 154 has a generally triangular shape as viewed from the side, the inside drag 156 is more in the nature of a trapezium. From Figures 18 and 19, it will be noted that both of the drag teeth 154 and 156 have a transverse horizontal lower edge extending from an outside face of the toothed portion 124 of the blade 120, but that these horizontal edges extend inwardly from opposite faces and have opposite side edges tapered upwardly to provide clearance for a purpose to be described hereinafter. Particular attention is directed to that part of the blade portion 124 which is immedaitely forward of each of the drag teeth 154 and 156, whence it will be noted that the logside face is relieved so as to provide a channel 158 immediately ahead of the outside drag 154 and a channel 160 immediately ahead of the inside drag 156. The channels 158 and 160 are preferably shaped as clearly indicated in the elevational view of Figure 14 and in the cross-sectional views of Figures 18, 19 and 21. Attention is also directed to that part of the lower edge of the blade portion 124 which defines the channels 158 and 160, these lower edges being shaped to provide inclined ramp faces 162 and 164 leading from the inside face 128 upwardly into the channels 158 and 160, respectively.

A preferred distribution of the several types of teeth incorporated in the blades 120 and 122 is illustrated in Figures 14 and 15, from which it will be observed that both a forward and a rear end cluster of teeth comprise alternate inside cutters 148 and outside cutters 150. Intermediate these end clusters, however, the major cutting portion of the blade has the teeth arranged in the order of an inside cutter 148, a grooving cutter 152, and a logside cutter 150, an outside drag 154, then a channel 158, an inside drag 156, and finally a channel 160, following which the foregoing order is repeated over and over in accordance with the desired length of the blade assembly 36.

In addition to the rear ends of the blades 120 and 122 being retained in reciprocable juxtaposition as above noted, the forward ends are retained in similar relation by means of a retaining assembly 170 comprising a threaded guide member 172, a guide washer member 174.

and a flathead screw 176, all as clearly illustrated in the exploded view of Figure 13. The parts thus enumerated are assembled together so as to engage the slots 138 of the juxtaposed blades 120 and 122, as illustrated best in Figure 10. It will be understood, of course, that the dimensions of the assembly 170 are such as to retain the forward ends of the upper portions 126 of the blades 120 and 122 in freely slidable relation.

A blade case 180 slidably receives the continuous upper portions 126 of both the cutting blades 120 and 122. The arrangement is clearly shown in Figure 9, from which it will be observed that the case 180 includes parallel side plates 182 which are of a thickness less than the width of the shoulder 130 at the top of the toothed portions 124 of the blades 120 and 122. Thus, as clearly illustrated in Figure 9, the overall width of the case 180 including the side plates 182 and the portions 126 of the blades 120 and 122 received therein, is less than the combined thickness of the toothed portions 124 of the blades 120 and 122.

The side plates 182 of the case 180 may be formed from a single sheet of metal as illustrated in the drawings, or it may be formed of two sheets with a filling spacer at the upper edge as will be obvious to those skilled in the art. In addition to having the top edge closed as illustrated, the case 180 is provided with a continuous filler strip 184 disposed parallel to the top edge and spaced downwardly therefrom as illustrated in Figures 9, 10 and 12. The strip 184 is provided with vertical holes 186 spaced over its length as illustrated in Figure 12. The side plates 182 of the case 180 are also provided with spaced holes or apertures 188 arranged as best shown in Figures 2 and 12. These holes 188 are located at the elevation attained by the top edge of the back portions 126 of the blades 120 and 122.

The rear end of the case 180 is provided with flanged mounting brackets 190 by means of which a secure attachment is made to the cover 46 of the drive mechanism 34. Preferably, guard members 192 formed to the shape clearly indicated in Figures 1, 2 and 9 are secured, as by welding, to the outside of the case 180 at the forward end of the brackets 190. These guards 192, thus located, are just ahead of the forward limit of reciprocation of the crosshead members 108 and the spacing blocks 144.

A handle 196 comprising a tubular hand portion 198 and a horseshoe-shaped receiving portion 200 adapted to fit over the end of the case 180 in the manner illustrated in Figure 11 is provided for supporting the free forward end of the saw 30. Obviously, the use of a handle at the forward end of the blade assembly 36 is optional. Normally, such a handle is preferred only for relatively long blade assemblies.

Figure 12 shows the forward end of the case 180 to be provided with a filler plate 202 for closing the longitudinal channel formed between the strip 184 and the upper closed edge of the case 180, and this filler 202 also provides a solid attachment for the handle 196, the latter being secured by a thumb screw 204 which passes through an aperture 206 formed in the case 180 and the filler plate 202 to engage a nut 208 on the outside of the portion 200 of the handle 196. Preferably, the portion 200 has integral skirt elements 210 extending downwardly in flared relation as shown in Figure 11 to serve as guard elements at the forward end of the blade assembly 36.

Operation

The general mechanical operation of the portable power saw 30 will be obvious from the foregoing description and from the accompanying drawings. Clearly, the saw 30 is portable from the handle 50 or from the combined handles 50 and 198. With the prime mover 32 in operation and the clutch 40 engaged, power will be delivered to the blade assembly 36 in a manner to reciprocate the juxtaposed blades 120 and 122, one blade moving forward as the other moves backward.

The cutting action of the blades 120 and 122 is readily apprehended from the cross-sectional illustrations of the cutting teeth shown in Figures 16 through 20. From these figures, it is evident that the inside cutter 148 cuts wood immediately adjacent the mating blade 122, while the logside cutter 150 cuts at the extreme outside of the kerf. The grooving cutter 152 cuts out the portion intermediate that which is cut by the cutters 148 and 150 and serves to provide a finer, or less coarse, sawdust. The drag teeth 154 and 156 operate to scoop up the dust thus cut from the log, or the like, and to direct it into the channels 158 and 160. Passage of the dust into these channels is, of course, facilitated by the ramp faces 162 and 164. It will be observed, incidentally, that the cutting teeth 148, 150 and 152 extend below the lower edges of the drag teeth 154 and 156, so that the latter do not prevent the cutting teeth from preforming their intended function.

The major portion of the sawdust which enters the channels 158 and 160 emerges at the level of the shoulder 130 and then, due to the aforementioned comparatively narrow width of the blade case 180, is enabled to pass outside of the latter and to remain in the kerf as the blade assembly 36 moves through the log or the like.

A minor portion of sawdust may find its way into the case 180 between the plates 182, but will ultimately emerge from the apertures 188. The notches 132 in the upper edges of the back portions 126 of the blades 120 and 122 assist in moving this entrapped dust along inside the blade case 180 until it reaches the openings 188 therein.

Lubrication of the reciprocating blades 120 and 122 within the case 180 is effected by introducing a suitable lubricant into the channel formed between the upper edge of the case 180 and the closing strip 186 affixed therein. The lubricant is introduced into this channel by means of a conventional hose or fitting 212 and is distributed along the blades 120 and 122 through the holes 186 in the strip 184.

Clearly, there has been provided a portable power saw which fulfills the objects and advantages sought therefor.

It is to be understood that the foregoing description and the accompanying drawings have been given only by way of illustration and example. It is further to be understood that changes in the form of the elements, rearrangement of parts, and the substitution of equivalent elements, all of which will be apparent to those skilled in the art, is contemplated as being within the scope of the invention, which is limited only by the claims which follow.

What is claimed is:

1. In a portable power saw, the combination of two cutting blades, each of said blades including an elongated toothed portion provided with integrally formed teeth, said teeth including cutting teeth and drag teeth, said toothed portions each having a planar inside surface for contiguous slidable engagement with the corresponding surface of the other, said toothed portions each having a planar logside surface which terminates at an upper ledge, said logside surface being provided with predeterminately arranged channels extending from bottom to top of the respective toothed portions, each of said channels being immediately adjacent a respective drag tooth.

2. The combination of claim 1 wherein the toothed portion of each blade is provided with inside cutting teeth, logside cutting teeth, and grooving cutting teeth.

3. The combination of claim 2 wherein the toothed portion of each blade is further provided with both inside and outside drag teeth.

4. In a power saw, in combination, a pair of elongated cutting blades disposed in contiguous slidable relation with each other, each of said blades having a relatively thick lower tooth portion surmounted by a relatively thin upper back portion, the tooth and back portions of each blade including a common vertical planar sliding surface on one side and defining a horizontal ledge at the juncture of the two portions on the other side, each of said tooth portions having integrally formed teeth along its lower edge and having a plurality of channels spaced longitudinally along the ledge side of the tooth portion, each of said channels having its lateral depth less than the width of the horizontal ledge and extending upwardly from the lower toothed edge of the tooth portion so as to emerge at said ledge, and an elongated blade case having parallel side plates in embracing relation with said back portions, the thickness of each of said side plates being less than the width of either of said ledges.

5. The combination of claim 4 wherein the total width of the blade case is less than the overall width of both tooth portions at the level of the ledge, so that at least a portion of the aforesaid channels extends laterally beyond the blade case.

6. In a portable power saw, the combination of a pair of elongated cutting blades disposed in contiguous slidable relation with each other, each of said blades having a relatively thin upper back portion and a relatively thick lower tooth portion arranged to provide offset upper and lower surfaces on the non-juxtaposed side of each blade, and an elongated blade case comprising parallel side plates disposed in slidable embracing relation over the juxtaposed back portions of the contiguous blades, said side plates of the blade case being provided with longitudinally spaced apertures at the level attained by the received upper edges of the blades for exhausting sawdust from within the case, and the upper longitudinal edge of each blade being provided with a plurality of notches for urging the sawdust to the vicinity of the individual apertures.

References Cited in the file of this patent

UNITED STATES PATENTS

| Number | Name | Date |
| --- | --- | --- |
| 139,426 | Scholfield | May 27, 1873 |
| 829,158 | Keepfer | Aug. 21, 1906 |
| 836,048 | McIntosh | Nov. 13, 1906 |
| 853,255 | Miller | May 14, 1907 |
| 869,182 | Hotchkiss | Oct. 22, 1907 |
| 1,491,134 | De Northall | Apr. 22, 1924 |
| 1,537,980 | Asselin | May 19, 1925 |
| 1,676,071 | Bolinder | July 3, 1928 |
| 1,690,803 | Vander Wee | Nov. 6, 1928 |
| 1,726,863 | Singer | Sept. 3, 1929 |
| 2,064,676 | MacLeod | Dec. 15, 1936 |
| 2,152,183 | Fetterolf | Mar. 28, 1939 |
| 2,284,693 | Tompkins | June 2, 1942 |
| 2,573,573 | Jenkins | Oct. 30, 1951 |
| 2,594,997 | Ringgold | Apr. 29, 1952 |
| 2,598,480 | Wright | May 27, 1952 |

FOREIGN PATENTS

| Number | Country | Date |
| --- | --- | --- |
| 53,297 | Sweden | Dec. 27, 1922 |